United States Patent [19]

Ochiai

[11] 4,429,039

[45] Jan. 31, 1984

[54] PHOTOGRAPHIC ELEMENT

[75] Inventor: Takeji Ochiai, Fujimiya, Japan

[73] Assignee: Fuji Photo Film Co., Ltd., Kanagawa, Japan

[21] Appl. No.: 378,710

[22] Filed: May 17, 1982

Related U.S. Application Data

[63] Continuation of Ser. No. 671,928, Mar. 30, 1976, abandoned.

[30] Foreign Application Priority Data

Mar. 31, 1975 [JP] Japan .................................. 50-39528

[51] Int. Cl.$^3$ .......................... G03C 1/74; G03C 1/80; G03C 1/30
[52] U.S. Cl. .................................... 430/534; 430/523; 430/533; 430/535; 430/536; 430/537; 430/626; 427/385.5; 427/393.5; 427/407.1; 427/412.1; 427/412.5; 428/483
[58] Field of Search .............. 430/626, 533, 534, 535, 430/536, 537, 523; 428/483; 427/385.5, 393.5, 407.1, 412.1, 412.5

[56] References Cited

U.S. PATENT DOCUMENTS

| | | | |
|---|---|---|---|
| 3,142,568 | 7/1964 | Nottorf | 430/535 |
| 3,325,287 | 6/1967 | Yamamoto et al. | 430/626 |
| 3,394,006 | 7/1968 | Nishio et al. | 96/87 |
| 3,833,403 | 9/1974 | Kogure et al. | 96/87 |
| 3,898,089 | 8/1975 | Yamamoto et al. | 430/626 |

*Primary Examiner*—Charles L. Bowers, Jr.
*Attorney, Agent, or Firm*—Sughrue, Mion, Zinn, Macpeak & Seas

[57] ABSTRACT

A photographic element is described which is provided with a subbing layer comprising (1) a copolymer of a diolefin monomer and at least one vinyl monomer, and (2) a dichloro-2-triazine derivative.

9 Claims, No Drawings

PHOTOGRAPHIC ELEMENT

This application is a continuation application of Ser. No. 671,928, filed Mar. 30, 1976, abandoned.

BACKGROUND OF THE INVENTION

1. Field of the Invention

The present invention relates to a photographic element, more particularly, to a photographic element comprising a support with a hydrophobic surface provided with one or more photographic hydrophilic colloid layers.

2. Description of the Prior Art

As photographic supports, polyethylene terephthalate (hereinafter referred to as PET) film, cellulose triacetate film, polystyrene film, polycarbonate film, polyolefin film, laminated paper, and the like have been widely used due to their superior transparency, flexibility, or the like. The use of these films or paper as photographic supports, however, is subject to the difficulty that photographic layers, the major component of which is hydrophilic gelatin, are difficult to adhere thereto because of the supports hydrophobicity.

Two types of surface treatments are known in the art to overcome such problems. In the first method, a hydrophobic support is subjected to a surface activation treatment, such as a chemical, mechanical, corona discharge, flame, ultraviolet, high frequency wave, glow discharge, activated plasma, laser, mixed acid, or ozone oxidation treatment, and then coated directly with photographic emulsion layers. In the second method, a hydrophobic support is subjected to a surface treatment as above, provided with one or more subbing layers, and then coated with photographic emulsion layers. (For example, see U.S. Pat. Nos. 2,698,241, 2,764,520, 2,864,755, 2,864,756, 2,972,534, 3,057,792, 3,071,466, 3,072,483, 3,143,421, 3,145,105, 3,145,242, 3,360,448, 3,376,208, 3,462,335 and 3,475,193; British Pat. Nos. 788,365 and 891,469, and the like.)

Of these two methods, the latter is more effective and has been more widely practiced. The increase in adhesive strength by these surface treatments may be attributable to the formation of polar groups to a greater or lesser degree on the surface of the support which is inherently hydrophobic, to the removal of a very thin surface layer which may constitute a negative factor to its adhesive strength, and to the increase in the density of cross-linking, each of which results in an increase in the affinity between the support and polar groups contained in a subbing liquid.

Various subbing methods have also been used, either by applying to the support a first layer which is adhesive thereto and then applying thereon a second layer of a hydrophilic layer (multilayer method), or by applying to the support a layer consisting of a resin containing both hydrophilic and hydrophobic groups (single layer method).

Each of these methods has been well investigated. For example, a number of resins have been investigated such as copolymers obtained from monomers selected from vinyl chloride, vinylidene chloride, methacrylic acid, acrylic acid, itaconic acid, maleic anhydride and the like, as well as polyethyleneimine, epoxy resin, grafted gelatin, nitrocellulose, and the like. However, known methods have suffered from disadvantages such as those set forth below.

(A) Adhesive strength is insufficient

In particular, in the case of hydrophobic supports such as PET and polystyrene, adhesive strength sufficient for a photographic element could not be obtained by the aforementioned surface treatment alone. In addition, if the support was not subjected to an appropriate after treatment, such as washing, there may be caused a deterioration in photographic properties, particularly a significant increase in fogging with the passage of time due to the oxidative decomposition of the surface of the support. Even in cases where a subbing layer is applied thereon, a resin which has affinity for a hydrophobic support and, therefore, is adhesive thereto, generally has a poor affinity for a hydrophilic photographic layer coated thereon, so that sufficient adhesive strength is not obtained. On the contrary, when a hydrophilic resin having a strong affinity for a hydrophilic photographic layer is subbed, the subbing layer adheres well thereto, but only insufficiently to a hydrophobic support.

(B) A surface treatment is required

Surface treatments of a hydrophilic support, which are conducted to render its surface hydrophilic, suffer from various difficulties as described below.

Chemical treatments have the problem of variations of composition of an oxidant containing solution with the passage of time, and require surface treatments such as washing and drying. In the case of a surface treatment using a solvent which swells or dissolves the support, the flatness of the support may be deteriorated by the treatment as described hereinafter. In this case, if drying is carried out under conditions in which its flatness can be maintained, the swelling agent may remain in the support, whereby fogging may be induced in photographic emulsions.

UV treatment hardly contributes to increase the adhesiveness of a film support if it is carried out at ordinary temperature. In order to obtain good adhesion by this method, irradiation with UV must be at a temperature higher than the glass transition point of the support. In this case, the flatness of the support is apt to be impaired by a decrease in elasticity, shrinkage caused by heating, and nonuniformity of heating due to the differences in thickness. In such a case, other problems such as wrinkling, etc., may also be caused. From the viewpoint of equipment, there are disadvantages in that UV lamps have only a short life and are very expensive.

In corona discharge, static charges generated by corona discharge in the atmosphere accumulate on the surface of a PET film support, are injected into the film, and induce a leakage current, so that a very thin film of low molecular weight polymer deteriorated by oxidation is formed on the surface thereof; this is because the polar groups in PET having a very large dipole moment and act as a trap center for the transfer of the accumulated charge. By this treatment, however, sufficient adhesive strength is not obtained for a photographic layer which requires a strong stripping resistance, although fairly good results are obtained in printing properties. Accordingly, it is necessary to heat the PET film support to a temperature higher than its glass transition point. In this instance, there may be caused undesirable results similar to those with the UV treatment.

As noted above, there are also various problems in other surface treatment methods.

A surface treatment is nothing but an oxidative decomposition. By this treatment not only is the appearance of the PET film impaired, but also fog is generated due to the formation of trace amounts of oligomers, acetaldehyde, and the like. Such defects can be fatal in the photographic industry.

As will be understood from the lowering of the limiting viscosity of PET subjected to a surface treatment, the molecular weight of PET is reduced by the treatment, which becomes a problem in reusing the PET. If increased adhesion could be obtained without any surface treatment such would be preferred to make it possible to reuse the PET, which is a relatively expensive synthetic polymer, and to avoid problems relating to the disposal thereof.

(C) There are such problems as the harmful influence on human bodies', pollution, etc., due to the poisonous gases generated from the organic compounds used.

In order to further improve the adhesive strength of the aforementioned subbing layers, it is also known to incorporate into a subbing solution a large amount of a solvent having a high polarity and a high boiling point which is capable of swelling or dissolving the support, i.e., an etching agent, which is generally expensive. As etching agents for PET there are known, for example, aromatic compounds (such as those having a benzene ring, a naphthalene ring, a pyridine ring, a pyrrole ring, or a condensed ring, including those substituted by one or more groups such as alkyl, alkoxyl, acyl, nitro, cyano, halogen, hydroxyl, formyl, carboxyl, alkoxyl, carbonyl, hydroxyalkyl, aminoalkyl, haloalkyl, etc.), alcohols, ketones, carboxylic acids, esters, aldehydes, and the like. See, for example, British Pat. Nos. 772,600, 776,157, 785,789 and 797,425; U.S. Pat. No. 2,830,030; and West German Patent Nos. 1,020,457 and 1,092,652. Specific examples of etching agents include benzoic acid, salicylic acid, salicylates, monochloroacetic acid, dichloroacetic acid, trichloroacetic acid, trifluoroacetic acid, methanesulfonic acid, nitropropanol, benzyl alcohol, benzaldehyde, acetylacetone, acetylphenol, benzamide, benzonitrile, anisole, nitrobenzyl alcohol, chlorobenzyl alcohol, pyrrole, chloral hydrate, benzylamine, xylenediamine, nicotinic acid amide and nicotinic acid esters, as well as those having at least one phenolic hydroxyl group, such as phenol, o-chlorophenol, p-chlorophenol, dichlorophenol, phenylphenol, chlororesorcin, orcinol, pyrogallol, gallic acid, o-cresol, m-cresol, p-cresol, resorcin, methoxyphenol, and the like. It is well known, however, that these etching agents are difficult to handle and are harmful to humans. Phenol compounds, in particular, have a very strong irritation and penetration effect on the skin, and hence cause many difficulties in use. In addition, full recovery of etching agents is necessary since they cause environmental pollution if contained in exhaust air or waste water. Facilities are thus often required for their recovery.

(D) The flatness of films is impaired

According to the prior art, drying of a subbing layer must be carried out at a fairly high temperature as mentioned above. In particular, a long period of heating is required for drying a subbing layer containing phenol compounds, which generally have a boiling point higher than 180° C. Therefore, expansion and lowering in elasticity of the support are caused at the early stage of drying because of the increase in crystallinity based on the penetration of a solvent, and a contraction of the support is caused at the latter stage of the drying, which results in a serious impairing of its flatness.

(E) Temperature control is difficult during the drying of a subbing layer

In general, the etching power of a solvent largely depends on the temperature. Consequently, in cases where the adhesion of the subbing layer is attained by the anchoring effect of a resin, the adhesion itself largely depends on the temperature during such steps as coating, drying, etc. This is a serious problem from the viewpoint of stable production because of the difficulty of temperature control.

SUMMARY OF THE INVENTION

It is, therefore, one object of the present invention to provide a photographic element having good adhesion between its support and a photographic layer.

It is another object of the present invention to provide a photographic element having good adhesion between its support and a photographic layer even when no surface treatment is applied thereto.

It is a further object of the present invention to provide a composition capable of adhering a photographic layer to a support even by means of a single subbing layer.

It is a still further object of the present invention to provide a photographic element, the production of which does not necessarily require the use of a harmful organic solvent and, hence, causes no air or water pollution.

It is another object of the present invention to provide a subbing solution which exhibits a reduced skin irritation effect.

It is a further object of the present invention to provide a photographic element having excellent flatness.

It is a still further object of the present invention to provide a photographic element the subbing properties of which do not worsen with variations of temperature during coating and drying.

According to the present invention, there is provided a photographic element comprising a support having thereon at least one subbing layer containing (1) at least one copolymer of about 10 to about 90% by weight of at least one diolefin monomer and about 90 to about 10% by weight of at least one vinyl monomer, and (2) at least one dichloro-s-triazine derivative.

DETAILED DESCRIPTION OF THE INVENTION

As later portions of the specification will make clear, the present invention is not limited to the use of any special type of support. However, in the photographic art, polyethylene terephthalate has proven to be an extremely popular support material as it has many advantages such as good transparency, flexibility, chemical stability and the like. It is used in many photographic elements, and at many points in the following specification the discussion will be specific to polyethylene terephthalate. However, when such discussion is offered, it should be clear that the present invention is not limited thereto.

In employing the subbing solution of the invention, there is no need to add thereto an etching agent as described hereinbefore, but an etching agent may, of course, be used therein, if desired. If an etching agent is used, most preferably it is present in an amount of from about 0.05 to about 0.2 g/m² of the support. Typical preferred etching agents are resorcinol and chloral hydrate.

From the discussion now to be offered, it will be appreciated that 3-component copolymers (terpolymers) are preferred in the present invention; however, 2-component copolymers are also useful, and the initial discussion below will deal with such 2-component copolymers.

The diolefin monomer exhibits rubber elasticity, i.e., the first component in the copolymer is a compound that has two ethylene bonds within its molecule. It may be either an unsaturated aliphatic compound shown by $C_nH_{2n-2}$ (wherein n represents a positive integer of from 4 to about 20), or an unsaturated aliphatic compound shown by $C_nH_{2n-4}$ (wherein n represents a positive integer not less than 4). Specific examples of useful diolefin monomers include conjugated dienes, such as butadiene, isoprene, chloroprene and unconjugated dienes, such as 1,4-pentadiene, 1,4-hexadiene, 3-vinyl-1,5-hexadiene, 1-allyl-1-cyclopentene, 1,5-hexadiene, 3-methyl-1,5-hexadiene, 3,4-dimethyl-1,5-dihexadiene, 3,4-diethyl-1,5-hexadiene, 1,2-divinylcyclopropane, 4-vinyl-1-cyclohexane, 1,6-heptadiene, 3,5-diethyl-1,6-heptadiene, 4-cyclohexyl-1,6-heptadiene, 3-(4-pentenyl)-1-cyclopentene, 1,7-octadiene, 1,8-nonadiene, 1,9-decadiene, 1,9-octadecadiene, 1-cis-9-cis-12-octadecatriene, 1,10-undecadiene, 1,11-dodecadiene, 1,12-tridecadiene, 1,13-tetradecadiene, 1,14-pentadecadiene, 1,15-hexadecadiene, 1,17-octadecadiene, 1,21-docosadiene, and the like.

Of the above dienes, most preferred are butadiene, isoprene and chloroprene.

Among these monomers, butadiene is readily available and inexpensive as it can be prepared from the cracking gases from thermally cracking a petroleum fraction, an intermediate product from petrochemical processings, or waste, and this invention will now be exemplified for butadiene, for purposes of brevity, though, of course, this invention is not limited thereto. The proportion of butadiene may be varied depending on the properties and content of other monomers present, as well as the properties required in the coated film. In cases where a layer containing a hydrophilic binder such as gelatin is immediately applied thereon, there may be employed an increased content of butadiene which is capable of improving the adhesive strength in the wet state, without blocking problems. In cases where the subbed film is once dried and wound, and then a gelatin layer is applied thereon, if the content of butadiene is too large and, in particular, the second component of the copolymer is a methacrylate, the subbing layer coated on the film support becomes fairly soft, so that blocking might be caused when it is wound up. It is, therefore, preferred to keep the butadiene content to less than about 60%, more preferably less than about 30% in this case. It should be understood, however, that it is not mandatory to so keep the butadiene content, and the earlier offered broader range is of general use.

In order to produce coated film bases having most excellent antiblocking properties, it is desirable to use a copolymer having a butadiene content of from about 15% to about 40% by weight. However, there can be used a copolymer having a butadiene content of from about 30% to about 60% by weight, desirably 32% to 40% by weight, in cases where one or more superposed subbing layers are directly applied onto the undermost one without a winding stop during processings, or in cases where the composition has added thereto particles which do not melt or undergo film forming at a temperature of from 50° to 300° C., i.e., a hard, heat stable melting agent such as polymethylmethacrylate, silica, etc., with a particle size smaller than about 1μ and a uniform particle size distribution, such a matting agent most preferably being used in an amount of about 0.1 to about 10 mg/m² of the support, or an antiblocking agent such as, for example, copolymers of glycidyl methacrylate and butyl methacrylate. In those instances where a "monolayer" subbing layer is used, the thickness thereof is most preferably on the order of about 0.1 to about 0.5μ; on the other hand, where one or more additional subbing layers are applied to a first subbing layer without an intermediate winding step, most preferably the total thickness of all the subbing layers (multilayer embodiment) is on the order of about 0.2 to about 1μ.

Such butadiene contents are also desirable from the viewpoint of the formation of a good subbing layer. On the other hand, however, when the content of the diolefin component such as butadiene is too small, the film coated with the copolymer tends to become brittle and to have optical defects as a support for a photographic element.

A first kind of vinyl monomer for the second component in the composition is a hard segment forming monomer, which will, of course, constitute a hard portion of the copolymer. In the copolymer, the component which has a higher glass transition temperature is the "hard segment".

Preferred examples of such monomers include vinyl aromatic compounds, α,β-unsaturated nitriles, methacrylates, halogenated vinyls, and vinyl esters, such as styrene, acrylonitrile, methyl methacrylate, vinyl chloride, vinyl acetate, and the like. Specific examples of suitable styrenes include styrene, methylstyrene, dimethylstyrene, trimethylstyrene, ethylstyrene, diethylstyrene, isopropylstyrene, butylstyrene, hexylstyrene, cyclohexylstyrene, decylstyrene, benzylstyrene, chloromethylstyrene, trifluoromethylstyrene, ethoxymethylstyrene, acetoxymethylstyrene, methoxystyrene, 4-methoxy-3-methylstyrene, dimethoxystyrene, chlorostyrene, dichlorostyrene, trichlorostyrene, tetrachlorostyrene, pentachlorostyrene, bromostyrene, dibromostyrene, iodostyrene, fluorostyrene, trifluorostyrene, 2-bromo-4-trifluoromethylstyrene, 4-fluoro-3-trifluoromethylstyrene, vinylbenzoic acid, methyl vinylbenzoate, and the like. As to other monomers, any of their derivatives may be employed, provided that they are capable of forming a hard segment in the copolymer.

Of the above "hard" segments, most preferred are styrene and acrylonitrile.

In short, this component is used to improve the physical properties of the subbing copolymer. It can be used at a proportion of from about 10 to about 90% by weight based on the total weight of the copolymer. The hardness of the coated film of the copolymer depends on the proportion of this component. For example, in the case of styrene, the second order transition point, the film strength, scratch resistance during conveyance in the form of a roll, and slippage properties on winding are increased, and optical properties as a support for a light sensitive element are improved with increased contents thereof.

When the content of this second component is too great, the subbing copolymer becomes too brittle and, hence, its film forming property is impaired. A particularly preferred content of the second component is from 40 to 70% by weight of the copolymer.

A second kind of vinyl monomer as the second component in the subbing copolymer is one capable of increasing the adhesion between the subbing copolymer and a hydrophilic polymer, which may be represented by the following general formula:

wherein R represents a hydrogen atom, an alkyl group, most preferably an alkyl group having 1 to 8 carbon atoms, —CH$_2$COOH, —CH$_2$CH=CHCHO, —CH$_2$—COOR$_1$ (where R$_1$ is a group containing 1 to about 6 carbon atoms, for example, —CH$_2$COOCH$_2$CH$_2$CH$_2$, —CH$_2$COOCH$_2$, —CH$_2$CH$_2$ and a group containing, for example, 1 to about 6 carbon atoms in combination with nitrogen or sulfur, for example,

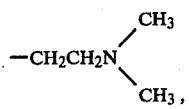

—CH$_2$CH$_2$SCH$_3$). In the above formula X represents a functional monomeric group, i.e., a monomeric group which illustrates hydrophilicity, selected from a carboxyl group, an amide group, an amino group, an allyl group, an oxirane group, a hydroxyl group, a vinyl group, a vinylidene group and an ester linkage, such as —COOH, —CONH$_2$,

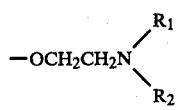

(where R$_1$ and R$_2$ are a hydrogen atom, an alkyl group, most preferably an alkyl group having 1 to 4 carbon atoms, or a methylol group),

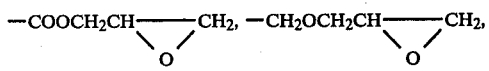

—COOCH$_2$CH$_2$OH, —COOCH$_2$CH(OH)CH$_2$, —CHO, —CH$_2$CH=CHCHO, —R$_3$NHCH$_2$OR$_4$ (where R$_3$ and R$_4$ are an alkyl group, most preferably an alkyl group having 1 to 6 carbon atoms), —COOCH$_2$CH=CH$_2$,

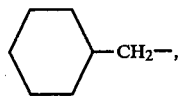

—COOC$_2$H$_4$OC$_2$H$_4$OCH$_2$CH=CH$_2$, —COOC$_2$H$_4$OCH$_2$CH=CH$_2$,

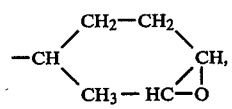

—CH$_2$OH, —COOCH$_2$CH=CH$_2$,

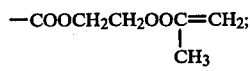

more specifically, acrylic acid, methacrylic acid, itaconic acid, acrylamide, methacrylamide, 2-aminoethyl vinyl ether, dimethylaminoethyl methacrylate, t-butylaminoethyl methacrylate, N-methylolacrylamide, N-methylolmethacrylamide, glycidyl acrylate, glycidyl methacrylate, acryl glycidyl ether, 2-hydroxyethyl acrylate, 2-hydroxyethyl methacrylate, 2-hydroxypropylacrylate, 2-hydroxypropyl methacrylate, acrolein, crotonaldehyde, allyl acrylate, vinyl toluene, alyloxyethyl acrylate, allyloxyethyl methacrylate, 4-vinylcyclohexanone monoepoxide, allyl alcohol, allyl methacrylate, diallyl itaconate, ethyleneglycol dimethacrylate and diallyl compound, as well as derivatives thereof, for example, acrylic acid derivatives (e.g., methyl acrylate, ethyl acrylate, propyl acrylate, butyl acrylate, amyl acrylate, ethylhexyl acrylate, octyl acrylate, t-octyl acrylate, 2-methoxyethyl acrylate, 2-butoxyethyl acrylate, 2-phenoxyethyl acrylate, chloroethyl acrylate, hydroxyethyl acrylate, cyanoethyl acrylate, hydroxypropyl acrylate, dimethylaminoethyl acrylate, 2,2-dimethylhydroxypropyl acrylate, 5-hydroxypentyl acrylate, diethylene glycol monoacrylate, trimethylolpropane monoacrylate, pentaerythritol monoacrylate, 2-hydroxy-3-chloropropyl acrylate, benzyl acrylate, methoxybenzyl acrylate, furfuryl acrylate, tetrahydrofurfuryl acrylate, phenyl acrylate, etc.); methacrylic acid derivatives (e.g., methyl methacrylate, propyl methacrylate, isopropyl methacrylate, amyl methacrylate, hexyl methacrylate, cyclohexyl methacrylate, benzyl methacrylate, cyanoacetoxyethyl methacrylate, chlorobenzyl methacrylate, octyl methacrylate, sulfopropyl methacrylate, N-ethyl-N-phenylaminoethyl methacrylate, ethylene glycol monomethacrylate, 2-hydroxyethyl methacrylate, 3-hydroxypropyl methacrylate, 2-hydroxypropyl methacrylate, 4-hydroxybutyl methacrylate, 5-hydroxypentyl methacrylate, 2,2-dimethyl-3-hydroxypropyl methacrylate, diethylene glycol monomethacrylate, trimethylolpropane monomethacrylate, pentaerythritol monomethacrylate, 2-methoxyethyl methacrylate, 2-(3-phenylpropyloxy)ethyl methacrylate, dimethylaminophenoxyethyl methacrylate, furfuryl methacrylate, tetrahydrofurfuryl methacrylate, phenyl methacrylate, cresyl methacrylate, naphthyl methacrylate, etc.); N-substituted acrylamides (e.g., methyl acrylamide, ethyl acrylamide, propyl acrylamide, isopropyl acrylamide, butyl acrylamide, t-butyl acrylamide, heptyl acrylamide, t-octyl acrylamide, cyclohexyl acrylamide, benzyl acrylamide, hydroxymethyl acrylamide, methoxyethyl acrylamide, dimethylaminoethyl acrylamide, hydroxyethyl acrylamide, phenyl acrylamide, hydroxyphenyl acrylamide, tolyl acrylamide, naphthyl acrylamide, dimethyl acrylamide, diethyl acrylamide, dibutyl acrylamide, diisobutyl acrylamide, diacetone acrylamide, methylbenzyl acrylamide, benzyloxyethyl acrylamide, β-cyanoethyl acrylamide, acryloyl morpholine, N-methyl-N-acryloylpiperadine, N-acryloylpiperidine, acryloylglycine, N-(1,1-dimethyl-3-hydroxybutyl)acrylamide, N-β-morpholinoethyl acrylamide, N-acryloylhexamethyleneimine, N-hydroxyethyl-N-methylacrylamide, N-2-acetoamidoethyl-N-acetyl acrylamide, etc.); N-substituted methacrylamides (e.g., methyl methacrylamide, t-butyl methacrylamide, t-octylmethacrylamide, benzyl methacrylamide, cyclohexyl methacrylamide, phenyl methacrylamide, dimethyl methacrylamide, diethyl methacrylamide, dipropyl methacrylamide, hydroxyethyl-N-methylmethacrylamide, N-methyl-N-phenyl methacrylamide, N-ethyl-N-phenyl methacrylamide, etc.); allyl compounds, such as allyl esters (e.g., allyl acetate, allyl caproate, allyl caprylate, allyl laurate, allyl palmitate, allyl stearate, allyl benzoate, allyl acetoacetate, allyl lactate, etc.), allyloxyethanol, allyl butyl ether, allyl phenyl ether, and the like; vinyl ethers (e.g., methyl vinyl ether, butyl vinyl ether, hexyl vinyl ether, octyl vinyl ether, decyl vinyl ether, ethylhexyl vinyl ether, methoxyethyl vinyl ether, ethoxyethyl vinyl ether, chloroethyl vinyl ether, 1-methyl-2,2-dimethylpropyl vinyl ether, 2-ethylbutyl ether, hydroxyethyl vinyl ether, diethylene glycol vinyl ether, dimethylaminoethyl vinyl ether, diethylaminoethyl vinyl ether, butylaminoethyl vinyl ether, benzyl vinyl ether, tetrahydrofurfuryl vinyl ether, vinyl phenyl ether, vinyl tolyl ether, vinyl chlorophenyl ether, vinyl 2,4-dichlorophenyl ether, vinyl naphthyl ether, etc.); vinyl esters (e.g., vinyl acetate, vinyl propionate, vinyl butyrate, vinyl isobutyrate, vinyl dimethylpropionate, vinyl ethylbutyrate, vinyl valerate, vinyl caproate, vinyl chloroacetate, vinyl dichloroacetate, vinyl methoxyacetate, vinyl butoxyacetate, vinyl phenylacetate, vinyl acetoacetate, vinyl lactate, vinyl β-phenylbutyrate, vinyl cyclohexylcarboxylate, vinyl benzoate, vinyl salicylate, vinyl chlorobenzoate, vinyl tetrachlorobenzoate, vinyl naphthoate, etc.); heterocyclic vinyl compounds (e.g., N-vinyl-oxazolidone, vinylpiridine, vinylpicoline, N-vinylimidazole, N-vinylpyrrolidone, N-vinylcarbazole, vinylthiophene, N-vinylethylacetamide, etc.); crotonic acids, such as crotonic acid, crotonamide, and crotonates (e.g., methyl crotonate, ethyl crotonate, butyl crotonate, hexyl crotonate, glycerol monocrotonate, etc.); vinyl ketones (e.g., methyl vinyl ketone, phenyl vinyl ketone, methoxyethyl vinyl ketone, etc.); itaconic acids (e.g., itaconic anhydride, methyl itaconate, ethyl itaconate, etc.); sorbic acid; cinnamic acid; methyl sorbate; citraconic acid; chloroacrylic acid; mesaconic acid; meleic acid; fumaric acid; unsaturated nitriles (e.g., acrylonitrile, methacrylonitrile, etc.); and the like. One or more of these monomers can be employed according to the desired effects.

The proportion of this second type of vinyl monomer component is preferably from 0.01 to 30% by weight of the total weight of the copolymer. It has been found that the adhesion between a coating layer of the copolymer and a hydrophilic colloid layer to be coated thereon, such as a photographic gelatin layer, can be remarkably improved by the use of this kind of monomer. In the range described above, a particularly preferred proportion therof is from 0.5 to 8% by weight of the copolymer. If less than 0.5% by weight is used, another functional vinyl monomer may be introduced therein, that is, a functional vinyl monomer other than the one used in such low proportions, while if it is greater than 20% by weight, the synthesis of the copolymer may be difficult and the improvement in adhesion may not be as remarkable as in the case where a copolymer having a content of such monomer less than 20% by weight is used. In addition, when a copolymer prepared using more than 20% by weight of this monomer is used in the subbing copolymer of this invention and the resulting subbing copolymer is applied on a support, it forms a translucent layer which results in an impairment of optical properties, that is, an apparent increase in fogging is caused. However, the third component may be in the form of a blend.

The amount of the two types of vinyl monomer components, however, must be limited within such a level that the free rotation of the principal chain molecules is not hindered and the rubber elasticity thereof is not lowered.

The strong adhesive power exhibited by the subbing copolymers of this invention which have rubber elasticity may be attributable to the fact that proper polymer elasticity and a proper cross-linking density in the copolymer can be obtained by copolymerization with the diolefin, and a wide range of film flexibility can be attained between the diolefin and hard segment, and there can additionally be present a second kind of vinyl monomer component which is capable of improving the adhesive strength to a hydrophilic binder.

Preferred combinations of monomers include styrene-butadiene-acrylic acid, styrene-butadiene-itaconic acid, styrene-butadiene-acrylamide, styrene-butadiene-2-aminoethyl vinyl ether, styrene-butadiene-N-methylolacrylamide, styrene-butadiene-glycidyl acrylate, styrene-butadiene-allyl glycidyl ether, styrene-butadiene-2-hydroxyethyl acrylate, styrene-butadiene-acrolein, styrene-butadiene-crotonaldehyde, styrene-butadiene-allyl alcohol, styrene-butadiene-allyl acrylate, styrene-butadiene-allyloxyethyl acrylate, styrene-butadiene-allyl alcohol-N-methylolacrylamide, styrene-butadiene-diallyl itaconate, styrene-butadiene-ethylene glycol dimethacrylate, and the like. (As to these components and polymerization procedures, see U.S. Pat. Nos. 2,604,457 and 2,798,861; British Pat. No. 681,031; Japanese Patent Publication 332/59; German Patent No. 1,017,787; U.S. Pat. No. 2,970,116; Canadian Patent No. 567,165; U.S. Pat. Nos. 2,681,897 and 2,900,359; British Pat. No. 831,056; U.S. Pat. Nos. 2,567,304 and 2,723,971; British Pat. No. 845,046; U.S. Pat. Nos. 2,849,416 and 2,918,391; Japanese Patent Publication 8,730/59; U.S. Pat. Nos. 2,987,508, 2,722,625 and 2,692,876; G. S. Tickeltal, *J. Polym. Sci.*, 44 523 (1960); U.S. Pat. No. 2,931,749; Japanese Patent Publication 914/66; and Belgian Patent No. 630,641.)

In cases where a styrene-butadiene rubber (SBR) or carboxyl modified SBR is applied on a biaxially stretched crystallized film of, for example, polyethylene terephthalate, only insufficient adhesive strength is obtained between the film and a silver halide emulsion layer in the wet conditions during photographic processing.

While not particularly limitative, it is preferred that the copolymers of the present invention exhibit a molecular weight of from about 10,000 to about 1,000,000, even more preferably from about 250,000 to about 600,000, which corresponds to a viscosity of from about 10 to about 5,000 cps (using a B-type viscometer), even more preferably from about 30 to about 150 cps (B-type viscometer).

In the present invention, adhesiveness is improved by the combined use of one or more dichloro-s-triazine derivatives.

Examples of dichloro-s-triazine derivatives as are used in the present invention include those represented by the following general formulae:

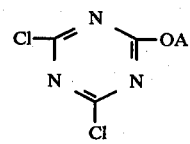

and/or

-continued

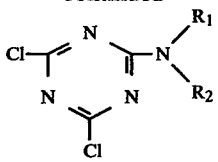

wherein A represents an alkyl group, a cyclic alkyl group, an aryl group, an aralkyl group, a metallic atom or a hydrogen atom; and $R_1$ and $R_2$ each represents a hydrogen atom, an alkyl group, a cyclic alkyl group, an aryl group, an aralkyl group or an —$NHR_3$ group (in which $R_3$ is an alkyl group or an acyl group), wherein $R_1$ and $R_2$ may be bonded to each other to form a ring having no metallic atoms or may form a 5- or 6-membered ring containing O, S, or an —$NR_4$ group (in which $R_4$ is an alkyl group), for example, a 5- or 6-membered ring such as

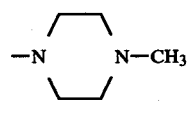

or

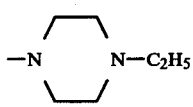

For the above groups $A_1$, $R_1$, $R_2$ and $R_4$, most preferred alkyl groups are methyl and ethyl groups, a most preferred aryl group is a phenyl group, a most preferred aralkyl group is a benzyl group, a most preferred acyl group is an acetyl group, and most preferred metallic atoms are sodium and potassium.

The necessary adhesive strength for the subbing layer can be attained by incorporating into the polymeric subbing copolymer of the invention from about 0.001% by weight to about 200% by weight of the dichloro-s-triazine compound, based on the weight of the copolymer. Generally speaking, when less than about 1 mg/m² of the support of the triazine derivative is used, adhesion in the wet state tends to be insufficient.

Specific examples of dichloro-s-triazine derivatives are as follows:

1. 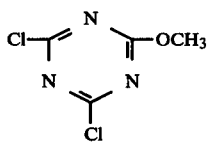

2. 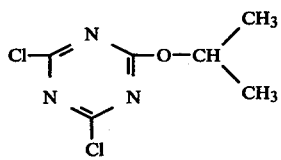

3. 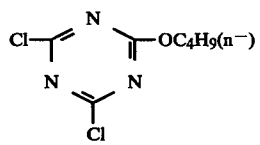

4. 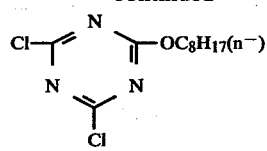

5. 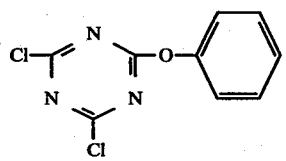

6. 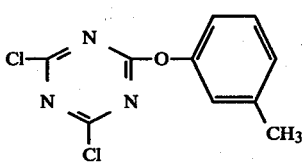

7. 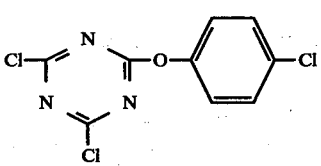

8. 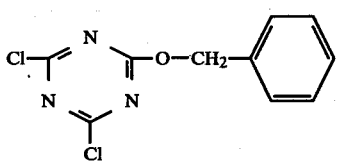

9. 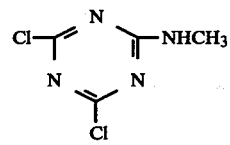

10. 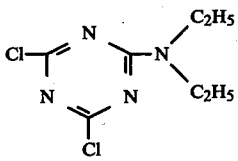

11. 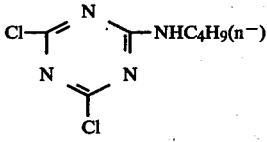

12. 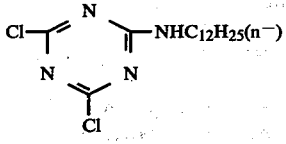

13. 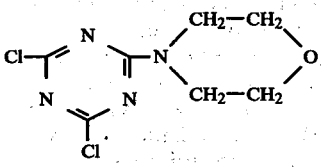

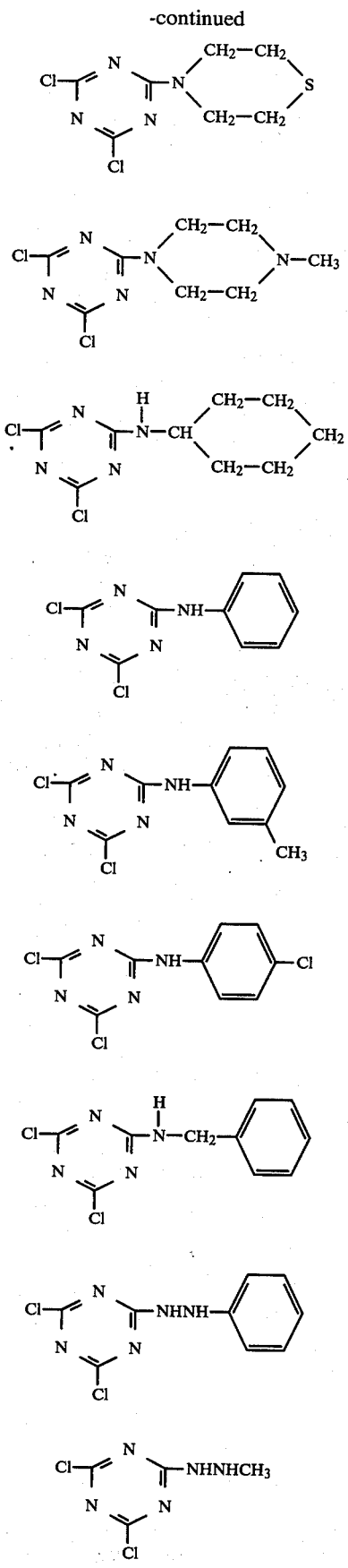

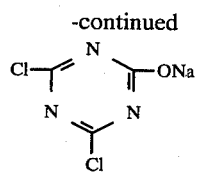

These triazine derivatives can be classified into two groups according to their use: (1) those that are effective when added in the form of a dispersion, such as 2,4-dichloro-6-methoxy-1,3,5-triazine, 2,4-dichloro-6-phenoxy-1,3,5-triazine, 2,4-dichloro-6-diethylamino-1,3,5-triazine, 2,4-dichloro-6-phenylamino-1,3,5-triazine, etc., most typically in a solvent such as methanol, acetone, dimethyl formamide and the like, with the general rule bing the smaller the size of the droplets in the dispersion, the more preferred the results; and (2) those that which are effective when used in a latex of the emulsion-in-water type, such as 2,4-dichloro-6-hydroxy-1,3,5-triazine sodium sulfate, etc. The latter has a good stability with the passage of time. Combination of two or more of these compounds may also be used.

These dichloro-s-triazine derivatives can be prepared by allowing reacting cyanuric chloride with the corresponding active hydrogen containing amine, hydroxyl compound or the like (see, for example, *Yuki Gosei Kyokai Shi,* Vol. 18, pp. 102 and 186). The above described dichloro-s-triazine derivatives are soluble in solvents such as alcohols, ketones, esters, hydrocarbons, halogenated hydrocarbons, etc., e.g., methanol, ethanol, acetone, methyl ethyl ketone, ethyl acetate, butyl acetate, benzene, toluene, dichloromethane, dichloroethane, etc., can be used in the form of a solution in one of such solvents, and can be incorporated into most dispersions of the copolymers in an organic solvent containing water. In particular, Compound 23 is stable in water.

Solutions containing the dichloro-s-triazine derivatives are stable at ordinary temperature so long as the solution is not strongly acidic. The dichloro-s-triazine derivatives may also be incorporated into a hydrophilic colloid layer to be coated on the subbing layer of this invention, in which case the derivatives are incorporated into the hydrophilic colloid layer so as to provide the derivatives in an amount of from about 1 to about 50 mg/m² of the support.

Supports used in the present invention include those consisting of polymeric materials. Examples of supports particularly suited for use in photography include cellulose derivatives, such as cellulose acetate, cellulose acetate butyrate, cellulose acetate propionate and cellulose nitrate; styrene polymers such as polystyrene, styrene-butadiene copolymers, styrene-butadiene-acrylonitrile copolymers and poly-α-methylstyrene; polyesters, such as polyethylene terephthalate, polyhexamethylene terephthalate, polyethylene-2,6-naphthalate and polycarbonates; polyolefins, such as polyethylene and polypropylene; polymer coated paper; and the like. These supports may be transparent, or may contain a dye or pigment such as titanium dioxide. There may also be used plastic-laminated-paper or a plastic film subjected to a surface treatment as described in U.S. Pat. No. 3,515,567.

Mention will now be made of photographic layers used in the present invention.

As binding agents (hydrophilic organic protective colloids) for photographic layers, there may be used synthetic or natural hydrophilic high molecular weight compounds such as gelatin, acylated gelatins, such as phthalated gelatin, maleated gelatin, etc., cellulose derivatives, such as carboxymethylcellulose, hydroxyethylcellulose, etc., grafted gelatin, such as those grafted with acrylic acid, methacrylic acid, or amides thereof, polyvinyl alcohol, polyhydroxyalkyl acrylates, polyvinyl pyrrolidone, vinyl pyrrolidone-vinyl acetate copolymers, casein, agarose, albumin, sodium alginate, polysaccharides, agar-agar, starch, grafted starchs, polyacrylamide, acylated polyethyleneimide, or homo- or copolymers of acrylic acid, methacrylic acid, acrylamide, N-substituted acrylamides and N-substituted methacrylamides, or partially hydrolyzed products thereof. They can be used either alone or in combination.

What else the photographic layer contains is not critical in this invention so long as one of the above described hydrophilic polymers is employed as the binding agent therefor, but there may generally be present therein silver halides, physical development nuclei for a diffusion transfer process, and light sensitive diazo compounds, as well as various additives, couplers, latex polymers, and the like.

It was difficult in the prior art to firmly adhere photographic layers to a hydrophobic support since the binders used therein were hydrophilic as described above.

There may also be used compatible mixtures of two or more of the above binders. Among the aforementioned binders, there is most widely used gelatin, but the gelatin may be replaced partly or wholly by other high molecular weight materials or gelatin derivatives.

As the optional resins used in the subbing layer, it is preferred, with respect to adhesive strength, to use one identical to one in the photographic layer coated thereon. Of course, there may also be used combinations of different kinds of binders, or relatively hydrophilic ones other than those described above. In general, the primary difficulty in subbing techniques lies in the achievement of good adhesion between a hydrophobic support and the hydrophilic colloid layer, while adhesion between two hydrophilic layers can be attained without particular difficulty since a strong bonding strength is exerted therebetween.

In addition to the earlier materials, examples of resins that have a strong affinity for photographic layers include those obtained from monomers that contain at least one polar group such as a carboxyl, carbonyl, hydroxyl, sulfoxyl, amino, epoxy or acid anhydride group, for example, homopolymers obtained from acrylic acid, sodium acrylate, methacrylic acid, itaconic acid, crotonic acid, sorbic acid, itaconic anhydride, maleic anhydride, cinnamic acid, methyl vinyl ketone, hydroxyethyl acrylate, hydroxyethyl methacrylate, hydroxychloropropyl methacrylate, hydroxybutyl acrylate, vinylsulfonic acid, potassium vinylbenzenesulfonate, acrylamide, N-methylacrylamide, acryloylmorpholine, dimethylmethacrylamide, N-t-butyl-acrylamide, diacetoneacrylamide, vinylpyrrolidone, glycidyl acrylate, glycidyl methacrylate, etc., or copolymers of these monomers with other copolymerizable monomers; homopolymers obtained from ethylenically unsaturated esters or acids, for example, acrylates such as ethyl acrylate, butyl acrylate, etc., methacrylates such as methyl methacrylate, ethyl methacrylate, etc., or acrylic acid, methacrylic acid, or acid derivatives thereof, or copolymers of these monomers with other vinyl monomers; copolymers obtained from polybasic acids such as itaconic acid, itaconic anhydride, maleic acid, etc., and vinyl monomers such as styrene, vinyl chloride, vinylidene chloride, butadiene, etc.; or ternary copolymers obtained from these monomers and other ethylenically unsaturated monomers. They can be used either in the form of a solution in water or, if dispersible into water or an organic solvent such as a lower aliphatic alcohol or a lower ketone, in the form of a latex dispersed into water or an organic solvent in order to improve the adhesion to photographic layers.

Typical examples of the preparation of the copolymers used in the invention are as follows, wherein all quantities are parts by weight.

PREPARATION 1

Into an autoclave equipped with an stirrer were charged the following materials:

| | |
|---|---|
| Styrene (monomer) | 54 |
| Butadiene (monomer) | 38 |
| Acrylic acid (monomer) | 5 |
| Itaconic acid (monomer) | 3 |
| Sodium dodecylbenzenesulfonate (surfactant) | 3 |
| t-dodecylmercaptan (molecular weight modifier) | 0.2 |
| Tripotassium phosphate (dispersant) | 0.3 |
| Ammonium persulfate (polymerization catalyst) | 0.3 |
| Water | 100 |

After the atmosphere in the autoclave had been replaced with nitrogen gas, emulsion polymerization was carried out for 20 hours at a temperature of 50° C. and at a pressure of 5 atm. (due to the butadiene), and then the remaining monomers (ca. 5% based on the monomers charged) were evaporated off to give a latex having a solid content of 49% by weight. The resulting copolymer had a molecular weight of about 250,000.

PREPARATION 2

A latex was prepared as in Preparation 1 except for using the following materials:

| | |
|---|---|
| Butadiene (monomer) | 67 |
| Acrylonitrile (monomer) | 31 |
| Methacrylic acid (monomer) | 2 |
| Sodium dodecylbenzenesulfonate (surfactant) | 3 |
| t-dodecylmercaptan (molecular weight modifier) | 0.2 |
| Tripotassium phosphate (dispersant) | 0.3 |
| Ammonium persulfate (polymerization catalyst) | 0.3 |
| Water | 100 |

The thus prepared subbing copolymers can be coated by various coating procedures including dip coating, air knife coating, curtain coating or extrusion coating using hoppers such as described in U.S. Pat. No. 2,681,294. If necessary, two or more layers can be coated simultaneously by the procedures as described in U.S. Pat. Nos. 2,761,791, 3,508,947, 2,941,898 and 3,526,528, and in Harasaki et al., Coating Technology, Asakura Shoten, Tokyo (1973).

The coverage as solids content of the subbing solutions of the invention onto a film, e.g., a polyester film, is not especially restricted since it can be varied over a wide range depending on the particular use, but sufficient adhesion is generally obtained at a coverage of about 0.1 to about 100 g, preferably 0.4 to 50 g, per square meter.

It is described in Japanese Patent Publication 3,564/73, etc., that good adhesion between a polyester film support and a photographic emulsion layer can be obtained by using as a subbing material an emulsion polymerized copolymer without any surface treatment. It has been found that this method has the serious defect that the adhesive strength of the subbing layer is insufficient, in particular, in the wet state when the polyester film support is subjected to high external stress in an automatic processor along with chemical reaction during development, fixing, washing, etc. This is because only acidic groups are present as reactive functional groups in the copolymer according to this Patent Publication, so that a sufficient self cross-linking cannot be obtained merely by coating and drying it on a polyethylene terephthalate film. Further, the copolymer is easily solubilized in ordinary developing solutions which are alkaline and contain sodium sulfite, hydroquinone, etc., so that its adhesive power is greatly lowered. In addition, when a film is subbed with a copolymer containing only acidic functional groups, dried, and wound, a blocking phenomenon between subbed surfaces is caused since free acidic groups contained therein absorb moisture from the atmosphere, so that processing capability and the stability of the layer with the passage of time may lower. Such a blocking phenomenon is described in Japanese Patent Publication 3,564/73. In this Patent Publication, an improvement in anti-blocking capability is achieved by decreasing the content of unsaturated double bonds remaining in the polymer by means of an increase in the styrene content, i.e., a decrease of the butadiene content; or by applying on the copolymer layer an additional aqueous gelatin solution containing 3% by weight, based on the amount of gelatin, of formaldehyde.

The subbing materials of this invention provide a subbing layer having sufficient anti-blocking capabilities even when it is applied as the only subbing layer. It has been found that the subbing layer of the present invention is superior in scratch resistance, anti-blocking capabilities, and slippage effects to ones consisting of a copolymer containing only acidic groups, the surface of the latter ones being soft.

The following table shows a comparison of the present subbing method with that of the prior art.

|  | PRIOR ART | INVENTION |
|---|---|---|
|  | Dichlorotriazines | |
|  | Not present | Present |
| Copolymers Used | Styrene-butadiene-unsaturated acid | Styrene-butadiene-functional monomer |
| Base Used | Unstretched, or mono- or biaxially stretched film | Unstretched, or mono- or biaxially stretched film |
| Surface Treatment or Subbing | Biaxially stretched film is previously subjected to chemical treatment or coated with two subbing layers | No chemical treatment is required. Only a single subbing layer need be applied. |
| Anti-blocking Property | Very poor "D"* | Excellent "A"* |
| Adhesive Property | Poor in the wet state | Excellent even in the wet state |
| Stability of the Subbing Solution | Precipitated by the addition of 2 wt % of metal salts, based on the amount of the resin | Not precipitated by the addition of 10 wt % of metal salts, based on the amount of the resin |
| Gel Fraction | 80% | 90% |

*Meanings are later defined.

As is well known, dichlorotriazines are susceptible to hydrolysis. For example, when an aqueous solution of dichlorohydroxytriazine sodium salt is allowed to stand for 5 days at 20° C., more than 40% of the compound is hydrolyzed.

Strangely, when dichlorotriazines are incorporated into a copolymer latex containing diene compounds as in the case of the present invention, they remain stable at 20° C. for more than 3 months. The details of this phenomenon are quite unknown. However, this is presumably because dichlorotriazines are surrounded by a hydrophobic part of the latex, and undergo an addition reaction with the double bonds in the diene. This addition product acts as an electrolyte and, hence, serves to stabilize the latex against the addition of a metal salt. As is described in U.S. Pat. No. 3,035,017, the addition reaction between an ethylenically unsaturated compound and dichlorohydroxytriazine sodium salt presumably takes place between a carbon-chlorine bond and a double bond.

It is a characteristic of the present invention that excellent adhesion can be obtained in the wet state because of the use of a subbing layer comprising a dichlorotriazine.

Strong adhesive strength is required in the wet state for photographic materials that have to be subjected to a strong frictional forces at steps such as developing, washing, fixing, drying, etc.

The hygroscopic properties of copolymers of styrene, butadiene and an unsaturated acid depends on the content of the acid, hence the adhesive properties of a subbing layer utilizing such copolymers also depend on the content thereof. Unfortunately, when the acid content is high, the subbing layer becomes too hygroscopic. On the other hand, when the content is small, the adhesive strength of the layer becomes too poor.

As summarized in the previous table, it is advantageous that an aqueous subbing solution of this invention can confer strong adhesive strength even on biaxially stretched polyester films because of the incorporation of the dichlorotriazine.

The present invention will be further illustrated by the following Examples and Comparative Examples showing subbing systems which may or may not contain a dichlorotriazine. In the following Examples, parts are by weight unless otherwise noted.

The methods of testing were as follows.

(1) Method of testing the adhesive strength in the dry state:

Mesh-like perpendicular intersecting scratches, 4 mm apart from each other were made on the emulsion surfaces of an unexposed film and a processed and dried film by means of a razor blade, and an adhesive tape with good adhesive strength (e.g., Scotch Permacel Tape) was adhered thereto. The tape was then rapidly pulled off. In this test, grade A means that 0-5% of the emulsion was peeled off, grade B >5 but ≦30%, and grade C >30 ≦100%.

(2) Method of testing the adhesive strength in the wet state:

At processing stages such as development, fixing and washing, two intersecting scratches were made on the emulsion surface with a steel pen, and the emulsion surface was subsequently rubbed with a finger tip at right angles to the scratch. In this test, grade A means that the emulsion was not peeled off beyond the scratch, grade B means it was peeled off within 5 mm, and grade C means more than 5 mm beyond the scratch was peeled off.

(3) Anti-blocking test:

Ten sheets of a subbed film base (35×35 mm) were superposed by contacting the front surface with the back surface of the adjacent element to make 5 pairs of samples. The 5 pairs of superposed samples were put between two glass plates in a superposed relationship, and a 2 kg weight was put thereon. They were allowed to stand as they were for 24 hours in a thermostat (UHN-60 Type, manufactured by Shinto Kagaku Co., Ltd.) maintaned at 30° C. and 80% R.H. The samples were then gradually peeled apart, and the adhered area was measured. Grade A means that the adhered area was 0%, grade A' 0–1%, grade B 2–33%, grade C 34–50%, and grade D more than 50%.

(4) The ratio of scratch resistance in the dry state:

Scratch resistance values were measured 5 times at a scan speed of 10 mm/sec using a variable load scratch resistance tester with a needle having a tip of 0.4 R (Type HEDEN-18, manufactured by Shinto Kagaku Co., Ltd.). The ratio of scratch resistance values was calculated from the mean values of the three measurements other than the highest and the lowest one. (Prior to the measurement, the samples were conditioned for three hours at 23±3° C. and 65±5% R.H. The size of the samples was 252×303 mm.)

(5) Chemical stability (stability against the addition of metal salt):

An aqueous latex containing 30% of resin was prepared, and then 1 to 10% of manganese chloride, based on the amount of the solution, was added thereto with stirring. The chemical stability was evaluated by the amount of magnesium chloride at which the latex precipitated.

(6) Gel fraction (GV):

$$GV = \frac{W_1 - W_2}{W_1} \times 100$$

W: Weight of collected sample
W: Weight of sample that was evaporated to dryness from refined xylene and thereafter allowed to stand for 48 hours at 40° C. to reduce its solids content to less than 5%, filtered, and then dried.

EXAMPLE 1

Subbing compositions were prepared as in Preparation 1 using the following materials.

|  | Subbing Composition 1 |  | Subbing Composition 2 |  |
|---|---|---|---|---|
| Monomer | Butadiene | 38 | Butadiene | 38 |
|  | Styrene | 54 | Styrene | 54 |
|  | Acrylic acid | 5 | Acrylic acid | 5 |
|  | Itaconic acid | 3 | Itaconic acid | 3 |
| Additive | 2,4-dichloro-6-hydroxy-1,3,5-triazine sodium salt 0.14% (based on the amount of the solution) |  |  |  |

4 g of the thus prepared subbing composition 1 having a resin content of 50% was dissolved in 100 ml of distilled water, and the resulting composition coated onto a biaxially stretched, oriented crystallized polyethylene terephthalate (PET) film 200μ in thickness and 30 cm in width at a laydown of 20 ml per square meter of PET. This film was dried for 10 minutes at 120° C. and then coated with a conventional gelatinosilver halide emulsion (dry thickness of 5μ; hereafter the same unless otherwise indicated).

Adhesive strength in the dry and wet states, anti-blocking property, and the ratio of scratch resistance of the thus prepared photographic film of the invention, and those of a photographic film prepared in a similar manner as above using subbing composition 2, were as follows.

|  | Subbing Composition 1 | Subbing Composition 2 |
|---|---|---|
| Adhesive Strength in the Dry Stage | A | A |
| Adhesive Strength in the Wet State | A | D |
| Anti-blocking Property | A | D |
| Ratio of Scratch Resistance in the Dry State | 1.5 | 1.0 |
| Gel Fraction (%) | 90 | 80 |

As is shown by the above results, the subbing layer prepared from the composition of the invention has excellent adhesive properties, anti-blocking properties and scratch resistance.

Gel fraction, of course, is a measure of the degree of cross-linking in the subbing layer; generally, the higher the value, the better the wet strength of the subbing layer.

The photographic film according to the invention also had good photographic properties.

In the following Examples and Comparative Examples, all subbing compositions, etc., were applied at identical thickness using identical conditions, i.e., the only difference between an Example and a Comparative Example was the identity of the subbing composition.

EXAMPLE 2

Subbing compositions were prepared as in Preparation 1 using the following materials.

|  | Subbing Composition 3 |  | Subbing Composition 4 |  |
|---|---|---|---|---|
| Monomer | Butadiene | 67 | Butadiene | 67 |
|  | Acrylonitrile | 31 | Acrylonitrile | 31 |
|  | Methacrylic acid | 2 | Methacrylic acid | 2 |
| Additive | 2,4-dichloro-6-hydroxy-1,3,5-triazine sodium salt 0.15% (based on the amount of the solution) |  |  |  |

5 g of the thus prepared subbing composition 3 having a resin content of 50% was dissolved in 100 ml of distilled water and coated onto a PET film as in Example 1 at a laydown of 20 ml per square meter of the base, and then dried for 10 minutes at 120° C. Onto this subbed film was coated a silver halide emulsion at a dry thickness of 5μ. Adhesive strength in the dry and wet states, anti-blocking property, and the ratio of scratch resistance of the thus prepared photographic film and those of a photographic film prepared by using subbing composition 4 containing as the third component an acid only were as follows:

|  | Subbing Composition 3 | Subbing Composition 4 |
|---|---|---|
| Adhesive Strength in the Dry State | A | A |
| Adhesive Strength in the Wet State | A | D |
| Anti-blocking Property | A | D |
| Ratio of Scratch Resistance in the Dry State | 1.4 | 1.0 |
| Gel Fraction | 82 | 88 |

The above results show that subbing composition 3 which contains 2,4-dichloro-6-hydroxy-1,3,5-triazine sodium salt is superior to subbing composition 4 which contains as the third component an acidic functional group alone.

The photographic properties of the photographic films coated with the emulsion were good.

EXAMPLE 3

Subbing compositions were prepared according to the procedure of Preparation 1 using the following materials.

|  | Subbing Composition 5 |  | Subbing Composition 6 |  |
|---|---|---|---|---|
| Monomer | Butadiene | 48 | Butadiene | 48 |
|  | Styrene | 47 | Styrene | 47 |
|  | Itaconic acid | 5 | Itaconic acid | 5 |
| Additive | 2,4-dichloro-6-hydroxy-1,3,5-triazine sodium salt 0.15% (based on the amount of the solution) |  |  |  |

5 g of subbing composition 5 having a resin content of 50% was dissolved in 100 ml of distilled water, and then coated on a PET film as in Example 1 at a laydown of 20 ml per square meter of the base, which was then dried for 10 minutes at 120° C. On this subbed film was coated a silver halide emulsion.

Adhesive strength in the dry and wet states, anti-blocking property, and the ratio of scratch resistance of the thus prepared photographic film, and those of a photographic film prepared in the same manner as above by using subbing composition 6 not containing the additive, were as follows.

|  | Subbing Composition 5 | Subbing Composition 6 |
|---|---|---|
| Adhesive Strength in the Dry State | A | A |
| Adhesive Strength in the Wet State | A | D |
| Anti-blocking Property | A | D |
| Ratio of Scratch Resistance in the Dry State | 1.4 | 1.0 |

It can be seen from the above results that the subbing composition of the invention containing as the third component a styrene-butadiene copolymer and a 2,4-dichloro-1,3,5-triazine sodium salt in combination with an acidic functional group is superior to the one containing an acidic functional group alone.

EXAMPLE 4

Subbing compositions were prepared as in Preparation 1 using the following materials.

|  | Subbing Composition 7 |  | Subbing Composition 8 |  |
|---|---|---|---|---|
| Monomer | Butadiene | 38 | Butadiene | 38 |
|  | Styrene | 58 | Styrene | 58 |
|  | Itaconic acid | 4 | Itaconic acid | 4 |
| Additive | 2,4-dichloro-6-hydroxy-1,3,5-triazine sodium salt 0.17% (based on the amount of the solution) |  |  |  |

5 g of subbing composition 7 having a resin content of 49% were dissolved in 100 ml of distilled water, and the resulting composition was coated on a polyethylene terephthalate film as in Example 1 at a laydown of 20 ml per square meter of the base. This film was dried for about 10 minutes at 135° C. (in this case, drying had to be carried out at an elevated temperature in order to obtain practical adhesion in the wet state upon processing since the styrene content was greater). A silver halide emulsion was coated on this subbed film.

Adhesive strength in the dry and wet states, anti-blocking property, and the ratio of scratch resistance of the thus prepared photographic film, and those of the one prepared in the same manner as above using subbing solution 8 were as follows.

|  | Subbing Composition 7 | Subbing Composition 8 |
|---|---|---|
| Adhesive Strength in the Dry State | A | A |
| Adhesive Strength in the Wet State | A | D |
| Anti-blocking Property | A | D |
| Ratio of Scratch Resistance in the Dry State | 1.5 | 1.0 |

It can be seen from the results that the subbing composition additionally containing 2,4-dichloro-1,3,5-triazine was superior to the one containing the styrene-butadiene-itaconic acid copolymer alone.

As is clearly shown by these examples, the adhesive strength in the wet state upon processing is remarkably improved by the incorporation of a dichloro-s-triazine derivative, particularly 2,4-dichloro-1,3,5-triazine sodium salt, into a subbing solution of a styrene-butadiene latex modified with an acidic functional group.

While the invention has been described in detail and with reference to specific embodiments thereof, it will be apparent to one skilled in the art that various changes and modifications can be made therein without departing from the spirit and scope thereof.

What is claimed is:

1. A silver halide photographic light-sensitive material comprising a support having thereon a subbing layer and at least one light-sensitive silver halide emulsion layer over said subbing layer, wherein said subbing layer consists essentially of
   (1) at least one copolymer of about 10 to about 90% by weight of at least one diolefin monomer and about 90 to about 10% by weight of at least one vinyl monomer, and (2) at least one dichloro-s-triazine derivative represented by the following general formula

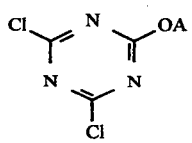

wherein A represents a metal atom.

2. The material of claim 1, wherein said diolefin monomer is selected from the group consisting of butadiene, isoprene and chloroprene.

3. The silver halide photographic light-sensitive material of claim 1, wherein said diolefin monomer is selected from the group consisting of butadiene, isoprene, chloroprene, 1,4-pentadiene, 1,4-hexadiene, 3-vinyl-1,5-hexadiene, 1-allyl-1-cyclopentene, 1,5-hexadiene, 3-methyl-1,5-hexadiene, 3,4-dimethyl-1,5-hexadiene, 3,4-diethyl-1,5-hexadiene, 1,2-divinylcyclopropane, 1,6-heptadiene, 3,5-diethyl-1,6-heptadiene, 4-cyclohexyl-1,6-heptadiene, 3-(4-pentenyl)-1-cyclopentene, 1-7-octadiene, 1,8-nonadiene, 1,9-decadiene, 1,9-octadecadiene, 1-cis-9-cis-12-octadecatriene, 1,10-undecadiene, 1,11-dodecadiene, 1,12-tridecadiene, 1,13-tetradecadiene, 1,14-pentadecadiene, 1,15-hexadecadiene, 1,17-octadecadiene, 1,21-docosadiene and 4-vinyl-1-cyclohexane.

4. The material of claim 1, wherein said copolymer contains about 10 to about 90% by weight of a diolefin monomer, about 40 to about 70% by weight of a first vinyl monomer selected from the group consisting of vinyl aromatic monomers, α,β-unsaturated nitrils, methacrylates, halogenated vinyl monomers and vinyl ester monomers and about 0.5 to about 8% by weight of a second vinyl monomer represented by the following formula:

wherein R represents a hydrogen atom, an alkyl group, —CH$_2$COOH, —CH$_2$CH=CHCHO and —CH$_2$COOR$_1$ (where R$_1$ is a group containing 1 to about 6 carbon atoms) and X represents a member selected from the class consisting of a carboxyl group, an amide group, an amino group, an allyl group, an oxirane group, a hydroxyl group, a vinyl group, a vinylidene group and an ester linkage.

5. The material of claim 4, wherein the first vinyl monomer is selected from the group consisting of styrene and styrene derivatives, and the second vinyl monomer is selected from the group consisting of acrylic acid, itaconic acid, acryl amide, aminoethyl vinyl ether, N-methylol acrylamide, glycidyl acrylate, allyl glycidyl ether, 2-hydroxyethyl acrylate, acrolein, crotonaldehyde, allyl alcohol, allyl acrylate, allyloxy ethyl acrylate and ethylene glycol dimethacrylate.

6. The material of claim 1, wherein said dichloro-s-triazine derivative is 2,4-dichloro-6-hydroxyl-1,3,5-triazine sodium salt or potassium salt.

7. The material of claim 4, wherein said copolymer is applied to the support in the form of a latex thereof.

8. The material of claim 1, wherein from about 0.001% by weight to about 200% by weight of the dichloro-s-triazine derivative, based on the weight of the copolymer, is present in the subbing layer.

9. The material of claim 1, wherein said support is polyethylene terephthalate.

* * * * *